United States Patent
Borgmann et al.

(10) Patent No.: US 9,258,939 B2
(45) Date of Patent: Feb. 16, 2016

(54) HILL-COMPENSATING PLANTER AND METHOD

(71) Applicant: Spudnik Equipment Co. LLC, Blackfoot, ID (US)

(72) Inventors: Rainer Borgmann, Blackfoot, ID (US); Tyson Jensen, Firth, ID (US)

(73) Assignee: SPUDNIK EQUIPMENT CO., LLC, Blackfoot, ID (US)

( * ) Notice: Subject to any disclaimer, the term of this patent is extended or adjusted under 35 U.S.C. 154(b) by 31 days.

(21) Appl. No.: 14/053,386

(22) Filed: Oct. 14, 2013

(65) Prior Publication Data

US 2015/0101517 A1 Apr. 16, 2015

(51) Int. Cl.
| | |
|---|---|
| *A01C 7/20* | (2006.01) |
| *A01C 9/08* | (2006.01) |
| *A01C 9/00* | (2006.01) |
| *A01B 49/06* | (2006.01) |
| *A01C 19/00* | (2006.01) |
| *A01C 9/02* | (2006.01) |

(52) U.S. Cl.
CPC ................. *A01C 7/208* (2013.01); *A01B 49/06* (2013.01); *A01C 9/00* (2013.01); *A01C 9/08* (2013.01); *A01C 19/00* (2013.01); *A01C 9/02* (2013.01)

(58) Field of Classification Search
CPC ............ A01C 9/00; A01C 9/08; A01C 19/00; A01C 7/208; A01C 7/20; A01C 7/00; A01C 9/02; A01B 49/06; A01B 49/00; A01B 49/04
USPC ........... 111/14–18, 22, 24, 34, 52, 59, 62–66, 111/69, 79–81, 170
See application file for complete search history.

(56) References Cited

U.S. PATENT DOCUMENTS 786,284 A * 4/1905 Green .............................. 111/23

* cited by examiner

*Primary Examiner* — Christopher J Novosad
(74) *Attorney, Agent, or Firm* — Parsons Behle & Latimer (57) ABSTRACT

A seed planting device operable on ground includes a main frame, having wheels, configured to be moved in a planting direction on the ground, a seed hopper, attached to the frame, having a discharge, and a cup-type seed dispenser, having a dispenser axis, disposed adjacent to the discharge of the hopper. The seed dispenser is configured to controllably receive and dispense individual seeds from the hopper and drop the seeds from a seed discharge below the frame. The seed hopper and seed dispenser are pivotally attached to the main frame and configured to rotate about a generally horizontal axis to maintain the dispenser axis in a substantially upright orientation relative to an uphill or downhill planting direction.

20 Claims, 7 Drawing Sheets

HILL-COMPENSATING PLANTER AND METHOD

BACKGROUND

1. Field of the Invention

The present invention relates generally to agricultural equipment. More particularly, the present invention relates to a planter device that compensates for hilly conditions, allowing more consistent planting in downhill and uphill directions.

2. Related Art

When planting seed potatoes in a sloped field, a standard cup-type planter will tend to plant fewer seeds when going uphill, and more seeds when going downhill. This is due to the change of angle in which the seed dispenser is functioning. When the seed dispenser is at an angle such that it is leaning backwards (uphill direction), the potato seed piece has a tendency to fall out of the cup that carries the seed through the unit, causing what is called a "skip" in the row. When skips occur on the uphill pass, less seed is planted in the field, which will decrease the crop yield.

On the other hand, when the seed dispenser is at an angle such that it is leaning forward (downhill direction), extra seed pieces will have a tendency to stay on the seed cup, rather than vibrating off. This can cause multiple seeds to be carried down through the seed dispenser and planted together, creating what is called a "double" or a "triple." When doubles and triples occur on the downhill pass, more seed is planted in this portion of the field, causing crowding of plants and resulting in smaller potatoes, which can, again, lead to a lower yield at harvest. Additionally, where planting is done in multiple passes through a field in alternating directions, as is common, the alternating uphill and downhill passes tend to create a striped pattern in the field, which makes the problem stand out.

The present application seeks to address one or more of the above-referenced issues.

SUMMARY

It has been recognized that it would be advantageous to develop a planter device that provides more consistent planting in both downhill and uphill operation;

It has also been recognized that it would be advantageous to develop a planter device that automatically compensates for uphill and downhill planting.

In accordance with one embodiment thereof, the present invention provides a seed planting device, operable on ground. The planting device includes a main frame, having wheels, configured to be moved in a planting direction on the ground, a seed hopper, attached to the frame, having a discharge, and a cup-type seed dispenser, having a dispenser axis, disposed adjacent to the discharge of the hopper. The seed dispenser is configured to controllably receive and dispense individual seeds from the hopper and drop the seeds from a seed discharge below the frame. The seed hopper and seed dispenser are pivotally attached to the main frame and configured to rotate about a generally horizontal axis to maintain the dispenser axis in a substantially upright orientation relative to an uphill or downhill planting direction.

In a more specific embodiment thereof, the planting device includes a self-leveling mechanism, coupled to the seed hopper, configured to automatically maintain the substantially upright orientation of the dispenser axis during uphill or downhill planting.

In another more specific embodiment thereof, the planting device includes a planting shoe, extending below the main frame forward of the seed discharge, configured to plow a furrow in the ground for receiving a dropped seed. The planting shoe is forwardly and rearwardly moveable with pivoting of the hopper, to substantially maintain a seed drop position a selected distance behind the planting shoe regardless of uphill or downhill angle.

In accordance with another embodiment thereof, the invention provides a seed potato planting device, configured for towing in a planting direction behind a towing vehicle on ground. The planting device includes a frame with wheels, and a seed dispensing assembly. The seed dispensing assembly includes a seed hopper, attached to the frame, having a discharge, and a cup-type seed potato dispenser, having a dispenser axis, adjacent to the discharge of the hopper. The dispenser is configured to controllably receive and dispense individual seeds from the hopper and drop the seeds from a seed discharge below the frame. The seed dispensing assembly is pivotally attached to the frame and is configured to rotate about a generally horizontal axis to maintain the dispenser axis in a substantially upright orientation relative to an uphill or downhill planting direction.

In accordance with another embodiment thereof, the invention provides a method of making a seed potato planting device for towing in a planting direction behind a towing vehicle on ground. The method includes pivotally attaching a seed potato dispensing unit, having a dispenser axis, to a wheeled frame of the planting device, and attaching a control mechanism to the seed potato dispensing unit. The control mechanism is configured to pivot the dispensing unit about a generally horizontal axis to maintain the dispenser axis in a substantially upright orientation relative to an uphill or downhill planting direction.

BRIEF DESCRIPTION OF THE DRAWINGS

Additional features and advantages of the invention will be apparent from the detailed description which follows, taken in conjunction with the accompanying drawings, which together illustrate, by way of example, features of the invention, and wherein.

DETAILED DESCRIPTION

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

As used herein, positional and directional terms, such as "forward," "backward," "front," "back," "top," "bottom," "above," "below," "in," "out," "up," "down," and the like, are to be interpreted relative to the respective illustrations in the drawings. These terms have specific reference to directions relative to the drawings, and are used for the purpose of description in connection with the drawings only, and do not necessarily indicate a specific direction, position or orientation relative to any other thing or any other positional or directional reference system, unless otherwise indicated. Those of skill in the art will recognize that the apparatus described herein may be used or described in a variety of orientations in which positional and directional terms could be used differently.

In order to provide more consistent planting in both downhill and uphill operation, a planter has been developed that reduces the occurrence of "skips" when planting uphill, and "doubles" and "triples" when planting downhill. Specifically, a hill-compensating cup-type planter has been developed that keeps the seed hopper and seed dispensing unit in a substantially upright position and keeps the seed drop point distance more consistent with respect to the planting shoe and covering disc, whether the planter travels uphill or downhill. This helps the planter device to perform well regardless of hills, thus helping to provide a greater yield at harvest.

Figure 12:
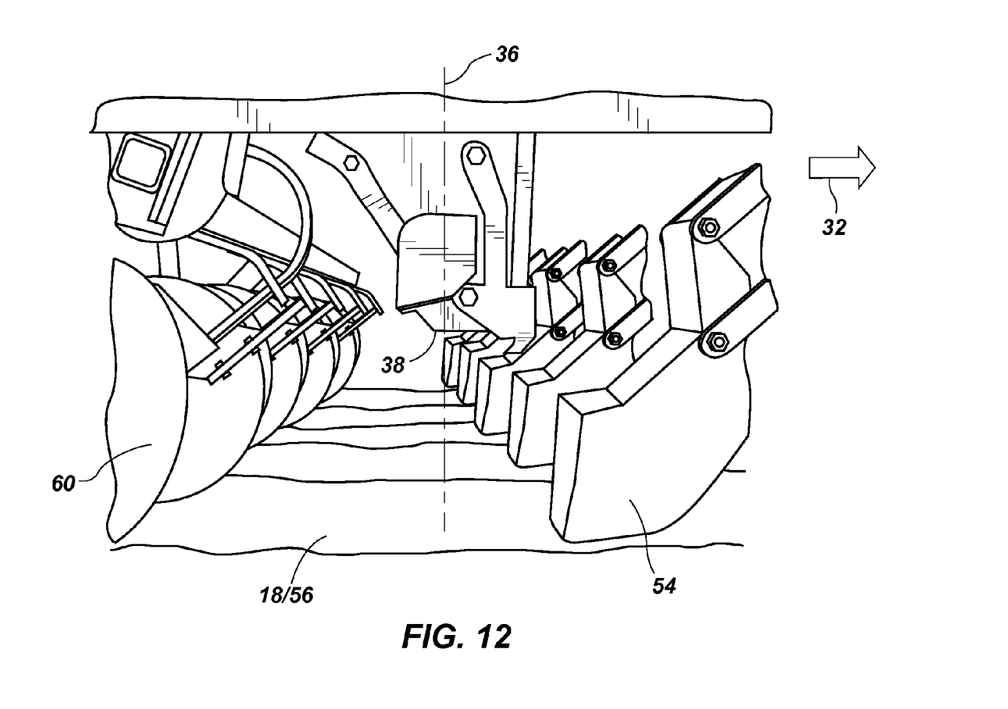
FIG. 12 is a side detail view, showing the relative positions of the planting shoe and seed drop mechanism relative to the cover disk and other structure, when the planter is positioned for operation on level ground.
Figure 13:
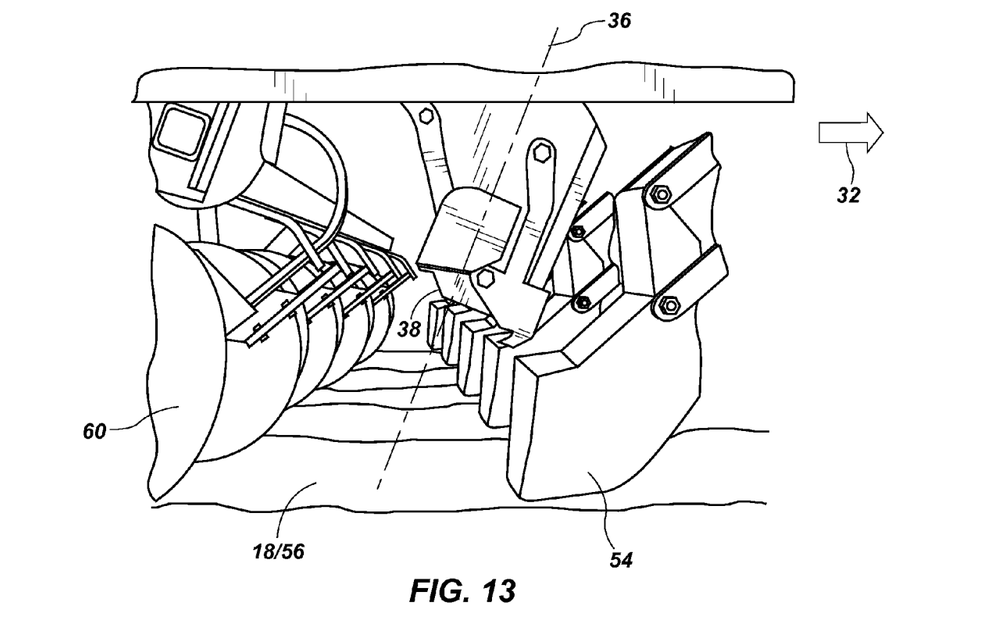
FIG. 13 is a side detail view, showing the relative positions of the planting shoe and seed drop mechanism relative to the cover disc and other structure, when the planter is positioned for operation on an uphill slope.
Figure 14:
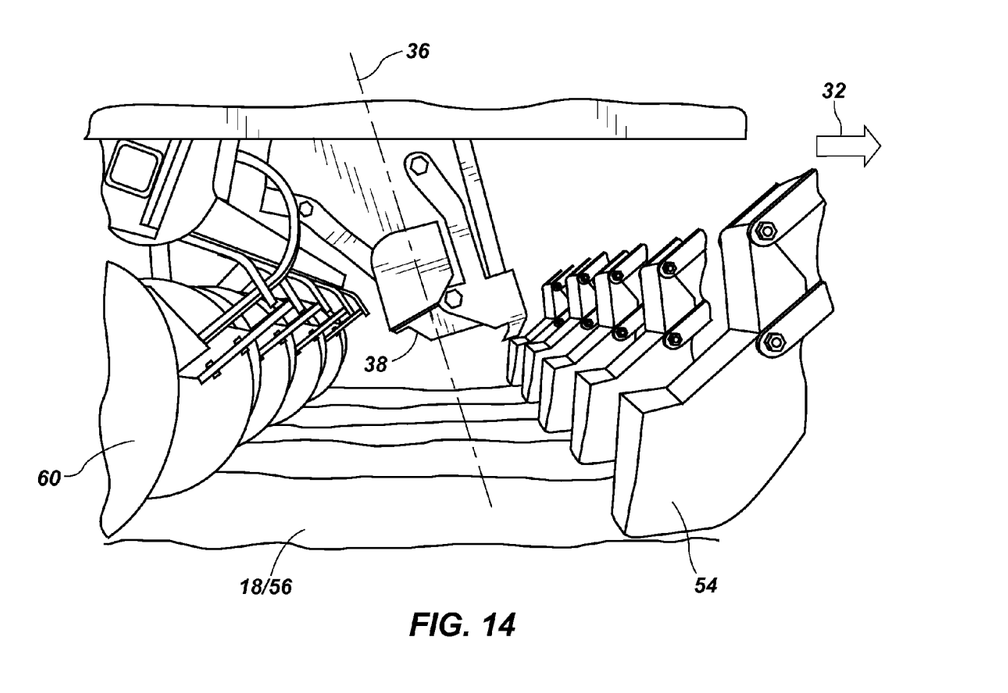
FIG. 14 is a side detail view, showing the relative positions of the planting shoe and seed drop mechanism relative to the cover disc and other structure, when the planter is positioned for operation on a downhill slope.

Shown in FIGS. 1-5 are a variety of views of an embodiment of a hill-compensating planter 10 in accordance with the present disclosure. Viewing FIGS. 1 & 2, the planter 10 generally includes a main frame 12 with forward wheels 14 and rear wheels 16 for supporting the planter on the ground 18. The wheels 14, 16 are positioned with a spacing to ride between crop rows (not shown), and typically include low pressure tires to allow the planter to ride upon soft ground. A hitch or drawbar 20 is attached to the forward portion of the frame 12 to allow the planter to be towed behind a towing vehicle, such as a tractor (21 in FIG. 2). Hydraulic lift cylinders 22 can be attached to the rear axle assemblies and to the drawbar 20, allowing an operator to raise the entire machine for transporting the planter 10 on roads or turning around at the end of crop rows. The raised position of the machine is shown in the views of FIGS. 12-14. Additionally or alternatively, the front of the planter 10 can be lifted using a three point hitch (not shown) located on the tractor 21 or other pulling vehicle.

Figure 1:
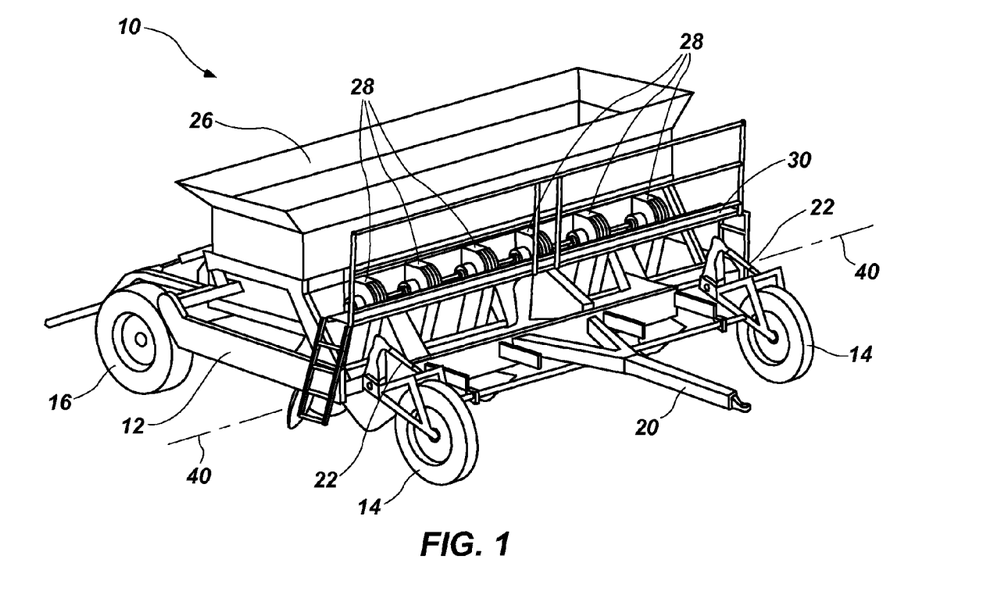
FIG. 1 is a front perspective view of an embodiment of a hill-compensating planter in accordance with the present disclosure.
Figure 2:
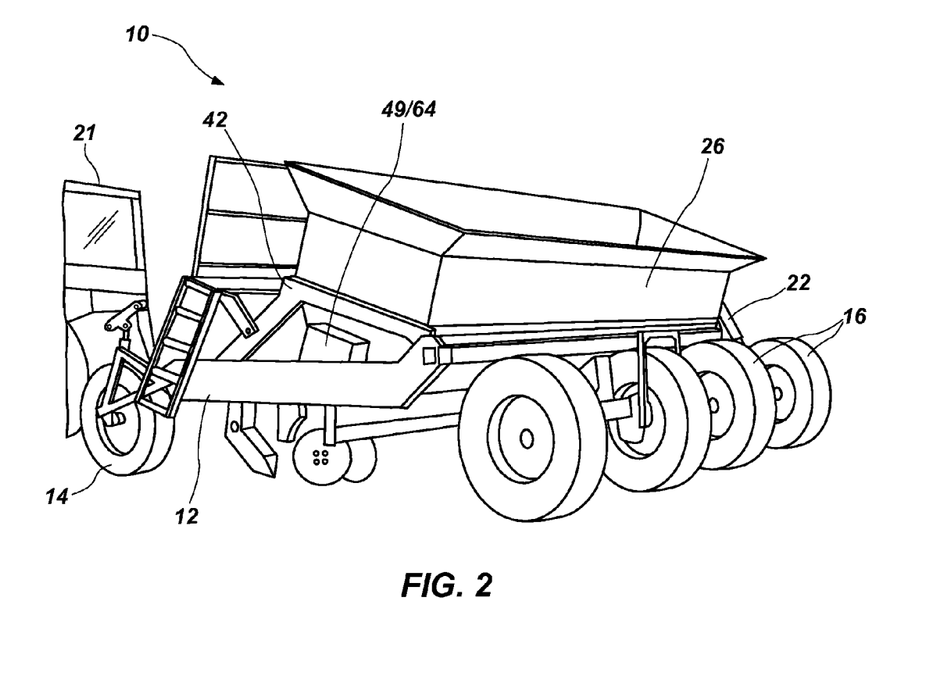
FIG. 2 is a rear perspective view of an embodiment of a hill-compensating planter in accordance with the present disclosure, showing the planter connected to a towing vehicle and the seed hopper positioned in the rearwardly tilted, position.

Attached to the main frame 12 is a seed dispensing assembly 24, which includes a seed hopper 26, having a series of seed dispensing units 28 (also referred to as "seed dispensers") extending downward and spaced at row-width intervals across the width of the hopper 26. The row width or spacing, and thus the spacing of the seed dispensers 28, can vary. For example, 34" and 36" row spacings are common. However, planters configured for other row spacings, such as 32", 38" and 40", can also be produced. The number of rows that are accommodated by the planter can also vary. The planter embodiment shown in FIGS. 1 & 2 is configured as a 6 row planter, but other sizes and configurations can also be produced. For example, planters configured for 4 rows or fewer, up to 12 or more rows are possible. A transverse catwalk 30 is attached to the hopper 26, allowing workers to monitor the dispensing of seeds from the hopper and to gain access to the hopper for refilling, maintenance, etc.

Figure 3:
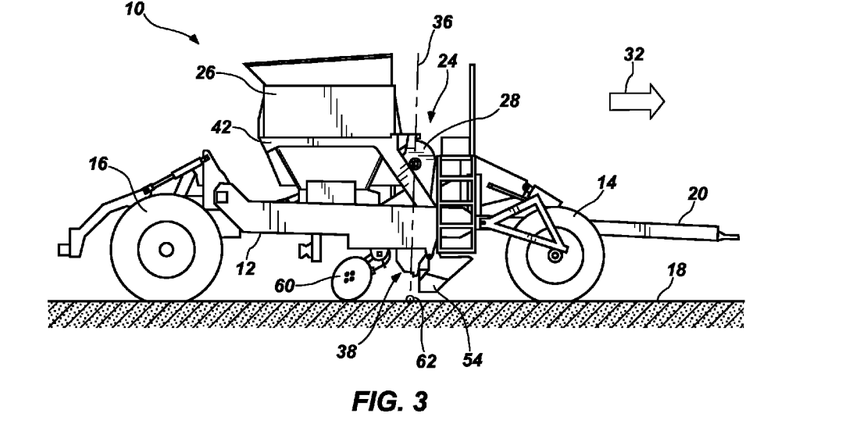
FIG. 3 is a side view of the hill-compensating planter of FIG. 1 positioned on level ground.
Figure 4:
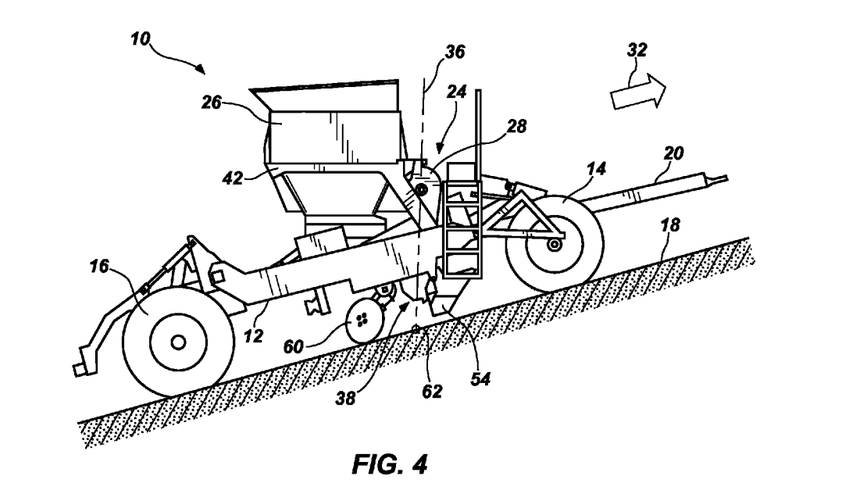
FIG. 4 is a side view of the hill-compensating planter of FIG. 1 positioned on an uphill slope.
Figure 5:
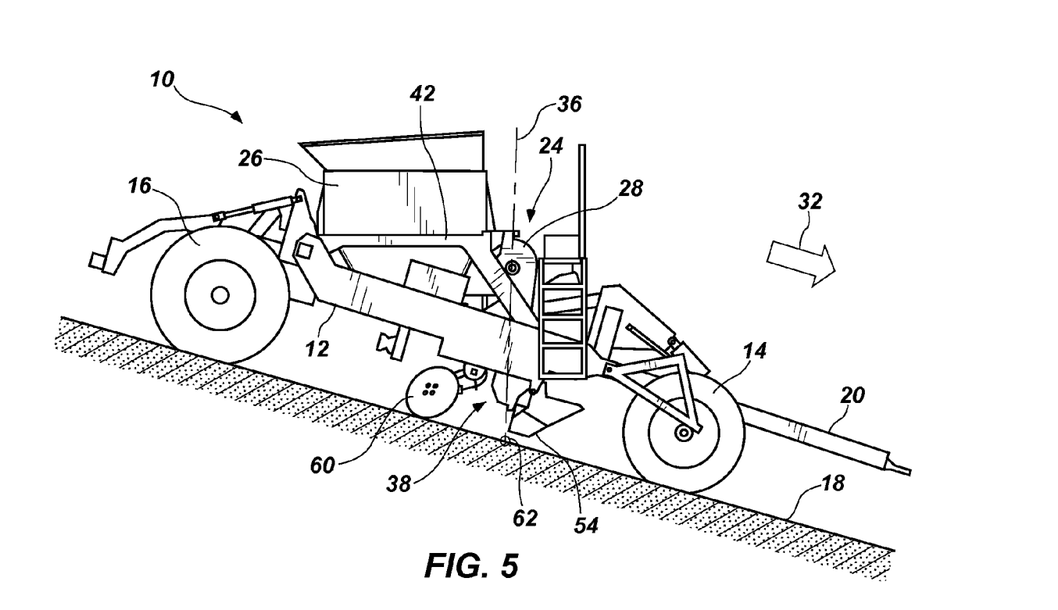
FIG. 5 is a side view of the hill-compensating planter of FIG. 1 positioned on a downhill slope.

In the figures herein, the direction of operation of the planter, the planting direction, is indicated by arrow 32, and the term "forward" has reference to motion in or toward the planting direction, while "backward" relates to the opposite direction. FIGS. 3-5 provide side views of the planter 10, showing the seed dispenser units 28 and their relationship to the planter frame 12 and the ground 18 in various modes of operation. The seed dispensers 28 can be cup-type seed dispensers, which are attached near the hopper 26 at each of multiple discharge locations (34 in FIG. 5) of the hopper.

Figure 6:
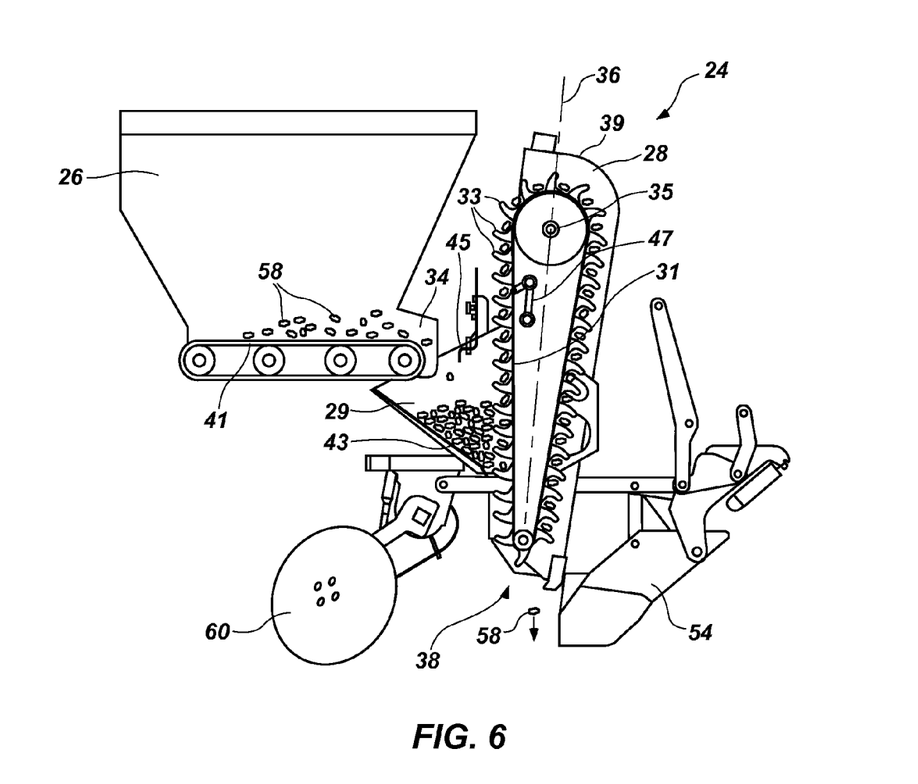
FIG. 6 is a partial side, cross-sectional view showing the inner workings of the seed dispensing unit in relation to the hopper, the planting shoe and the cover disc.

Shown in FIG. 6 is a partial side, cross-sectional view showing the inner workings of the hopper 26 and one of the seed dispensing units 28. The seed dispensers 28 are oriented with a generally upright dispenser axis 36, and have a seed bowl 29 positioned to receive seed potatoes 58 from the discharge 34 of the hopper 26. The seed dispensers 28 include an "endless" cup belt 31 having a plurality of cups 33 positioned along its length at regular intervals, and disposed over an upper pulley 35 and a lower pulley 37. The cup belt 31 moves generally vertically within the seed dispenser housing 39 as driven by the pulleys 35, 37, which rotate in a clockwise direction (in the view of FIG. 6), drawing seed potatoes 58 up, out of the seed bowl 29, around the top of the seed dispenser 28, and discharging them through a seed discharge 38 at the bottom of the seed dispenser 28.

The hopper 26 can include an internal feed chain 41 that feeds seed potatoes 58 out of the bottom of the hopper 26, through the hopper discharge 34 and into the seed bowl 29 of the seed dispenser 28. The seed bowl 29 can include a seed bowl shaker 43, designed to vibrate the floor of the seed bowl 29 to prevent bridging so that seeds 58 within the seed bowl 29 constantly flow toward the cup belt 31. A seed bowl sensor 45 can be provided to sense the depth of seeds 58 in the seed bowl 29, and readings from this sensor can be used to control the operation of the feed chain 41 of the hopper 26, so that seeds 58 are dispensed from the hopper 26 when the depth of seed in the seed bowl 29 drops below a specified height, and dispensing is halted when the depth of seed in the seed bowl 29 reaches another higher level. This allows the level of seeds 58 within the seed bowl 29 to be relatively consistent.

A belt shaker device 47 can also be provided to shake the belt 31 to singulate the seeds 58—that is, ensure that each cup 33 of the cup belt 31 takes only one seed 58. As noted above, the seed bowl sensor 45 helps keep the seed depth in the seed bowl 29 relatively constant, which is desirable for operation of the belt shaker 47. If the seed depth in the seed bowl is too high, more seed will press against the belt 31, so that the belt shaker 47 may not shake the belt as vigorously, potentially causing multiple seeds 58 to remain in individual cups 33, resulting in "doubles" or "triples." On the other hand, if the seed depth is too low, the belt shaker 47 may shake the belt 31 too vigorously, causing too many seeds 58 to fall from their cups 33, potentially resulting in empty cups and producing "skips" in seed distribution.

In the embodiment shown in the figures, the seed discharge 38 at the lower end of each seed dispenser 28 is positioned to be about 9"-15" above the ground 18. Other dispenser heights can be used, and this height can be adjustable in a given planter. The seed dispensers 28 are thus configured to controllably receive and dispense individual seeds from the hopper 26 and drop the seeds from the seed discharge 38 below the frame 12.

Mechanical operation of the seed dispensers 28 can be provided by a hydraulic motor (not shown) that is controlled by a computer controller (52 in FIG. 10), discussed in more detail below, which controls the entire planter 10. The hydraulic motor can be attached to a common seed dispenser drive shaft (not shown) that connects to the upper pulleys 35 of all seed dispensers 28 on the planter. The planter 10 can include a monitored rpm encoder (not shown) mounted or located at one of the wheel axles, and another rpm encoder mounted or located on the seed dispenser drive shaft and connected to the seed dispensers 28. The speed of the wheel(s) 14, 16 is sensed by the encoder(s), which transmits a signal to the controller 52, which in turn adjusts the speed of the seed dispensers 28 to match the speed of motion of the planter 10. With this sort of seed dispenser control system, the spacing of seed drops can be kept consistent, and can also be programmable and adjustable according to preferences of the user. Alternatively, the seed dispensers 28 can be driven by a purely mechanical system (not shown), such as one that includes chains and sprockets that are mechanically attached to one or more of the wheels of the planter and connected to the drive shaft of the seed dispensers. With either a computer controlled system or a direct mechanical drive system the speed of operation of the seed dispensers 28 can be kept directly proportional to the speed of the planter 10, so that seed drops remain at the desired spacing.

Advantageously, the seed dispensing assembly 24 is pivotally attached to the frame 12 and configured to rotate about a generally horizontal axis (40 in FIG. 1) to maintain the dispenser axis 36 in a substantially upright orientation relative to an uphill or downhill planting direction, as discussed above. The range of motion of the seed dispensing assembly 24 is illustrated in FIGS. 3-5, which show the planter 10 on level ground 18 (FIG. 3), going uphill (FIG. 4) and operating downhill (FIG. 5). The tilting of the seed dispensing assembly 24 keeps the hopper 26 upright or level, and the seed dispensers 28 substantially upright, at a relatively constant absolute angle, regardless of the hill. When the planter 10 operates uphill, as shown in FIG. 4, the seed dispensing assembly 24 tilts forward with respect to the main frame 12, but maintains a relatively constant absolute angle (i.e. angle with respect to true horizontal). When the planter 10 operates downhill, as shown in FIG. 5, the seed dispensing assembly 24 tilts backward with respect to the main frame, but again, maintains a relatively constant absolute angle. When on level ground, the seed dispensing assembly 24 sits at an upright position relative to the main frame 12, as shown in FIG. 3. The seed dispensing assembly 24 can also be tilted manually to any desired position. For example, to facilitate filling the hopper 26 with seeds it is convenient to tilt the hopper backward, as shown in FIGS. 2 and 9.

Figure 7:
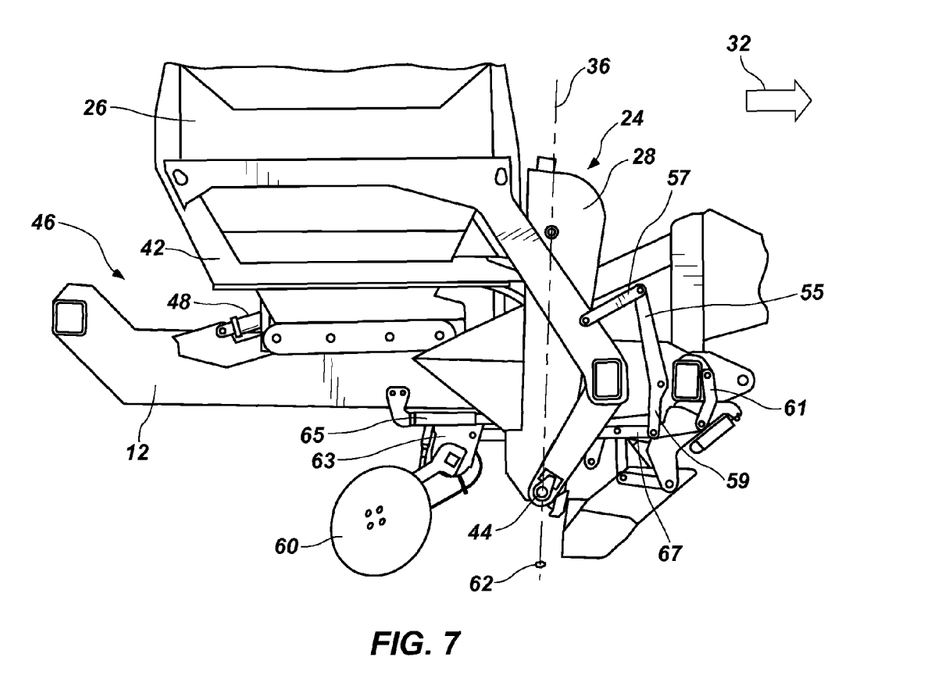
FIG. 7 is a partial side, cross-sectional view of the seed hopper and planter tilting mechanism with the seed hopper in the level position.
Figure 8:
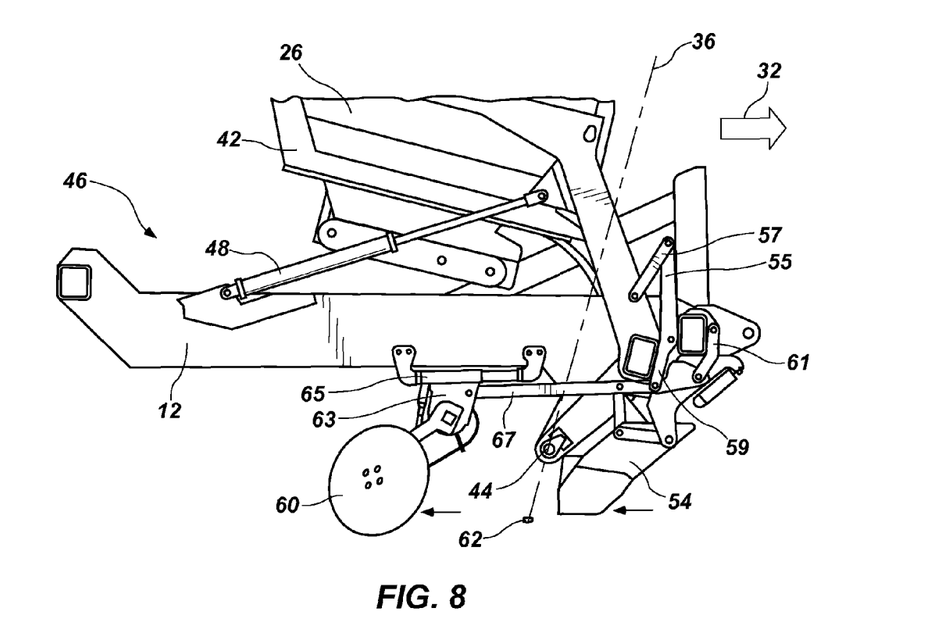
FIG. 8 is a detail side view of the seed hopper and planter tilting mechanism, showing the seed hopper and tilting mechanism in the forwardly tilted position.

In order to keep the dispensing unit 28 and hopper 26 upright, a sub frame 42 and tilting mechanism 46 are provided to allow for pivoting of the dispensing assembly 24 with respect to the planter frame 12. Side, cross-sectional views of a portion of the planter 10 are provided in FIGS. 7-9, showing the arrangement of the tilting mechanism 46 and seed dispensing assembly 24. In FIG. 7 the seed dispensing assembly 24 is in the position for level ground. The seed hopper 26 and tilting mechanism 26 are shown in the forwardly tilted position in FIG. 8 and in the rearwardly tilted position in FIG. 9.

Figure 9:
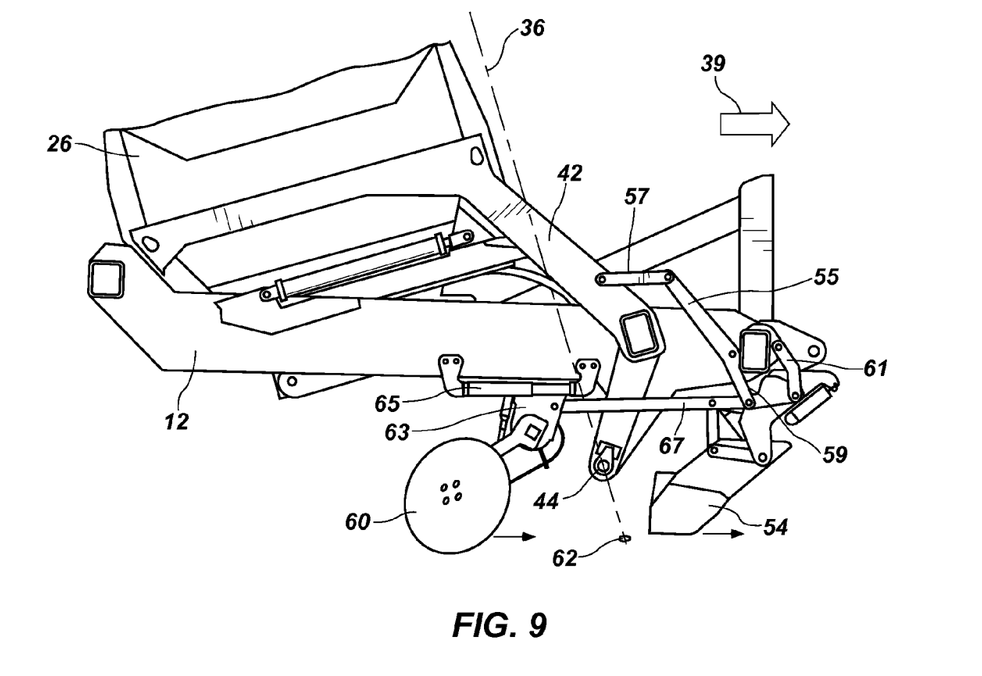
FIG. 9 is a detail side view of the seed hopper and planter tilting mechanism, showing the seed hopper and tilting mechanism in the rearwardly tilted position.

Viewing FIGS. 7-9, in the embodiment shown herein, the seed dispensers 28 and the hopper 26 are both attached to the sub frame 42. The sub frame 42 is pivotally connected to the main frame 12 at a pivot point 44 that is near the seed discharge 38, and is attached to the tilting mechanism 46. Positioning the pivot point 44 near the seed discharge 38 allows the discharge point to remain in a relatively consistent position, not changing in elevation or front-to-back position with tilting of the hopper 26, thus helping to maintain a consistent release point for the seed 58. The tilting mechanism 46 includes hydraulic cylinders or rams 48 connected between the main frame 12 and the sub frame 42, and configured for selectively tilting the entire seed dispensing assembly 24. When the hydraulic cylinders 48 are fully extended, the sub frame 42 and hopper 26 tilt to the forward position, shown in FIG. 8. When the hydraulic cylinders 48 are fully retracted, the sub frame 42 and hopper 26 tilt to the rearwardly tilted position shown in FIG. 9.

Referring to FIG. 2, the planter 10 includes a control mechanism 49, which can be attached to the planter sub frame 42 and contained within a controller housing 64. An interior view of an embodiment the controller housing 64, showing one configuration of the controller components, is provided in FIG. 10. The controller 49 can be divided into two parts, including an electrical components panel 66 and a hydraulic components panel 68. The electrical components panel includes a computer controller 52, such as a digital computing device having a processor and system memory, and an inclination sensor 50. The electrical components panel can also include other relays and wiring connections. The computer controller can be, for example, an MCS 3000 Controller System, and the inclination sensor can be a Tilt Sensor model no. B94.03535, both available from Grimme Electronics of Damma, Germany. The computer controller 52 can be connected to input and output devices (not shown), such as a digital display and data entry keyboard in the cab of the towing vehicle (21 in FIG. 2) to allow a user to provide input to the controller 52 and receive output therefrom. The controller 52 is connected to the inclination sensor 50 and the hydraulic cylinders 48 to send and/or receive electrical signals with them, and can be powered via an electrical connection to the towing vehicle (21 in FIG. 2) or via some other power source.

Figure 10:
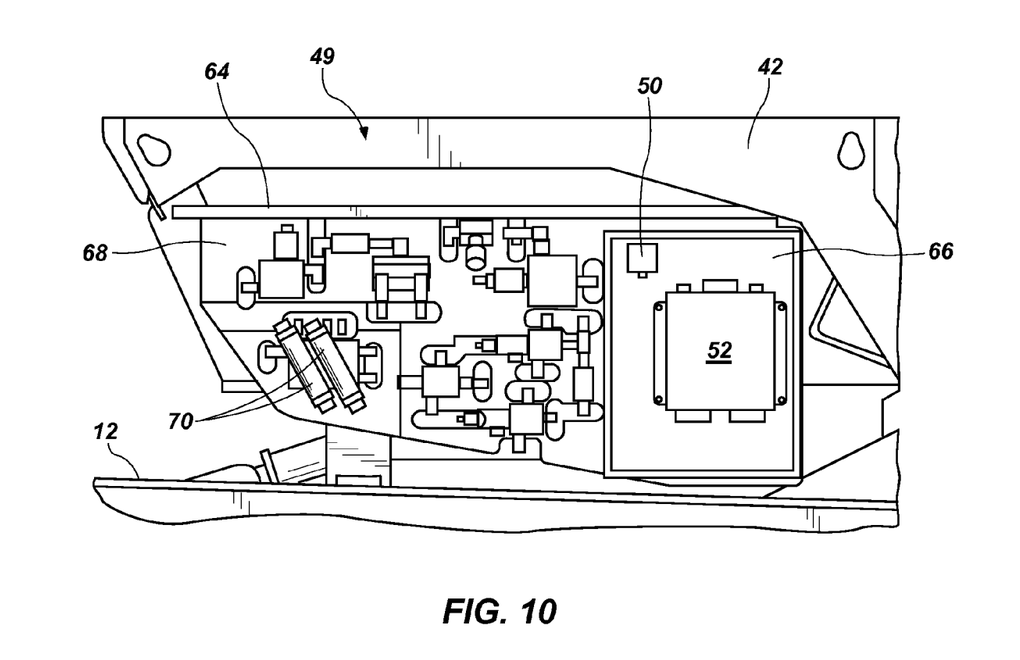
FIG. 10 is a detail view showing the interior of the electrical components panel and the hydraulic components panel.

The hydraulic components panel 68 includes solenoids 70 for actuating the hydraulic cylinders 48. The electrical components panel 66 and hydraulic components panel 68 can be contained in a single controller housing 64 and attached to the sub frame 42 and move with it. Wiring from the electrical panel 66 sends signals to the solenoids 70 in the hydraulic panel 68 according to inputs from either the operator (via input and output devices) or sensors on the planter 10. Signals from the controller 52 can control automated functions of the planter 10 and/or give output information to a display (not shown) that is located next to the operator inside the tractor.

The tilting mechanism 46, including the hydraulic cylinders 48, is thus under the control of the controller 52. This configuration allows the controller 52 to automatically control the magnitude, direction, timing and speed of tilting of the seed dispensing assembly 24 by controlling operation of the hydraulic cylinders 48 based on signals from the inclination sensor 50. The inclination sensor can detect tilting of the sub frame 42, and send an output to the controller 52. When the inclination sensor 50 indicates some angle that varies from level, the controller 52 receives this signal and adjusts the hydraulic actuators 48 to return the sub frame 42 to the level position. Accordingly, the inclination sensor 50, controller 52 and hydraulic cylinders 48 together provide a self-leveling mechanism, which can automatically maintain the substantially upright orientation of the dispenser axis 36 (and level orientation of the hopper) during uphill or downhill planting. It is to be appreciated that other arrangements of the controller 52 and inclination sensor 50 can be used. For example, rather than being attached to the pivoting sub frame 42, an inclination sensor 50 can be attached to the main frame 12, allowing it to indicate the inclination of the ground 18, with a second sensing device attached to the sub frame 42, to monitor its position relative to the main frame 12. In this embodiment the controller 52 can be configured to adjust the tilting of the sub frame 42 and hopper assembly to compensate.

The self-leveling mechanism described herein helps to promote consistent seed planting and also promotes accurate placement of seeds within a furrow 56, as discussed in more detail below. Additionally, the self-leveling feature also helps promote proper functioning of the seed bowl 29 and belt 31 and the various mechanisms associated with them. By keeping the seed bowl 29 upright, seeds are prevented from being too far back or too far forward in the seed bowl. If seeds are too far forward, they can be damaged by the belt 31 as individual cups travel upward across the outlet of the seed bowl 39. Additionally, if seeds strike the belt 31 as they exit the hopper 26 and enter the seed bowl 39, they can hit other seeds and knock them out of the cups, potentially causing a skip. On the other hand, if seeds are too far back in the seed bowl, bridging can occur, potentially leading to multiple skips. The self-leveling feature helps prevent all of these potentially undesirable conditions.

An angle at which the dispenser axis 36 is desired to stay (relative to the frame 12) can be programmable in the controller 52, based on a user's preference. The desired angle can vary from an absolutely vertical orientation of the dispenser axis 36. For example, it may be found that the seed dispenser 28 operates best at some angle at which the dispenser axis 36 is slightly off of a true vertical orientation. Such a position is still considered "upright," even though the dispenser axis 36 may vary from true vertical by some amount.

Once the user has set the desired angle, the controller 52 can be put into an "automatic" mode, in which the controller 52 automatically sends control signals to the hydraulic tilting mechanism 46 to adjust the sub frame 42 to stay in position to keep the dispensing axis 36 at the programmed "upright" angle as the planter frame 12 tilts below it (riding on the ground). The control system 49 can also have a "manual" mode in which a user can directly control the angle of the planting assembly 24. Manual mode can assist the user when filling the seed hopper 26 or transporting the planter 10 on the road to other locations.

The range of tilting motion for the sub frame 42 and seed dispensing assembly 24 can vary. In one embodiment the inclination sensor 50 can detect angles within a range of +/−20 degrees, and the sub frame 42, hopper 26 and seed dispensing units 28 have an angular range of +/−15.5 degrees (in both automatic and manual modes) relative to the main frame 12. Other angular ranges can also be used.

Figure 11:
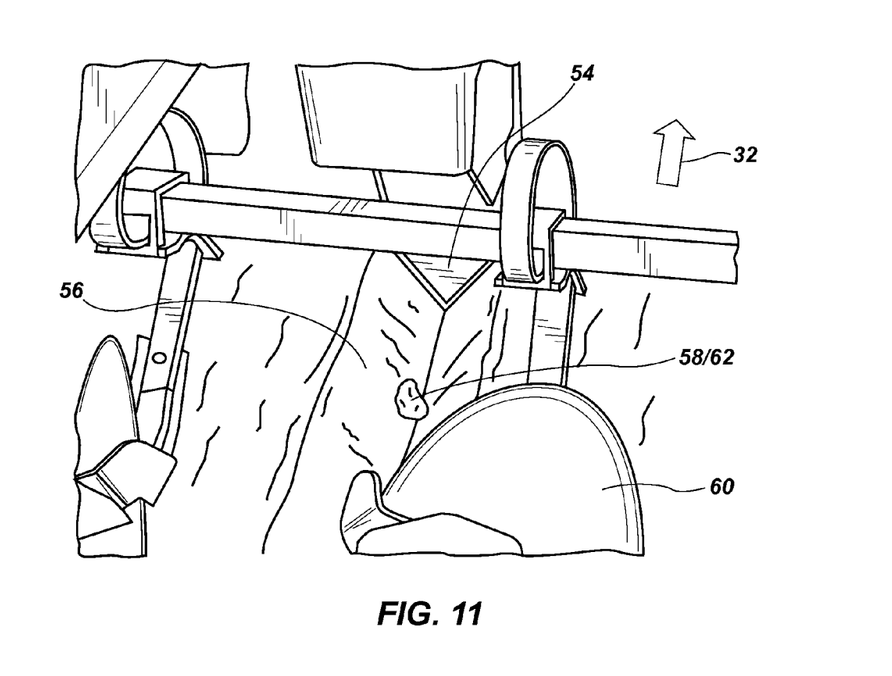
FIG. 11 is a top detail view, looking downward, of an embodiment of a hill-compensating planter in accordance with the present disclosure in operation, showing the planting shoe and seed drop location relative to the cover disc and other structure.

Extending downwardly from the frame 12 are a planting shoe 54, positioned forward of the seed discharge 38 and drop point 62, and a cover disc 60, positioned behind the discharge 38. The planting shoe 54 is best viewed in FIGS. 7-9 and 11-14. Referring to FIGS. 7 and 11, the planting shoe 54 is configured to plow a furrow 56 of a desired depth in the ground ahead of the seed discharge 38, for receiving a dropped seed 58. Positioned behind the seed discharge 38 is the cover disc 60, which is positioned to cover the furrow 56 and each seed 58 placed in it. The cover disc 60 is positioned to provide the desired cover over the seeds, so that the seeds are not too shallow or too deep. The view of FIG. 11 is a top detail view, looking downward, showing the planting shoe 54 and seed 58 at the seed drop location 62 relative to the cover disc 60 and other structure when the planter 10 is in operation.

As best viewed in FIGS. 7-9 and 12-14, the planting shoe 54 is forwardly and rearwardly moveable with pivoting of the planting assembly 24, to substantially maintain the seed drop position 62 a selected distance behind the planting shoe 54 regardless of uphill or downhill angle. The cover disc can also be forwardly and rearwardly moveable in concert with the planting shoe 54, as shown in FIGS. 7-9. In the embodiment of FIGS. 12-14 the cover disc 60 is attached to the frame 12 at a fixed location. Shown in FIGS. 8 and 13 are side views showing the planting shoe 54 and seed drop location 62 relative to the cover disc 60 and other structure when the seed dispensing assembly 24 is tilted for operation on an uphill slope, and FIGS. 9 and 14 show these structures when the seed dispensing assembly 24 is tilted rearwardly for operation on a downhill slope. The views of FIGS. 7 and 12 include the seed dispenser 28 and its position relative to the sub frame 42 and other components. The views of FIGS. 8 and 9 do not include the seed dispenser 28 in order to show the mechanism for moving the planting shoe 54 and cover disc 60 more clearly, but include the dispenser axis 36 and drop point 62 for reference.

The planting shoe 54 is connected to the sub frame 42 via a planting shoe pivot arm 55 and a planting shoe pivot link 57. The pivot link 57 is pivotally attached at one end to the sub frame 42, and is pivotally attached at its other end to the upper end of the pivot arm 55. The pivot arm 55 is pivotally attached to the main frame 12, and its lower end 59 is pivotally attached to the planting shoe assembly 54. A planting shoe idler arm 61 also pivotally connects the planting shoe assembly 54 to the main frame 12, thus providing a parallel arm attachment of the planting shoe assembly 54 to the main frame 12. This allows the planting shoe 54 to generally translate front to rear as the pivot arm 55 pivots.

In the embodiment of FIGS. 7-9 the cover disc 60 is attached to a cover disc mount 63, which is slidably mounted on a disc slide 65, which is fixedly attached to the main frame 12. A generally horizontal disc mount link 67 connects the disc mount 63 to the planting shoe assembly 54. The disc mount link 67 naturally transmits forward-backward motion of the planting shoe 54 to the disc mount 63. With this configuration, when the sub frame 42 tilts forward about its pivot point 44, as shown in FIG. 8, the planting shoe drive link 57 transmits this motion to the upper end of the planting shoe pivot arm 55, causing it to rotate clockwise (in these views). This rotation of the pivot arm 55 causes the lower end 59 of the pivot arm 55 to rotate rearwardly, thus causing the planting shoe 54 to translate rearwardly. At the same time, the disc mount link 67 also pushes the disc mount 63 rearwardly, causing the cover disc 60 to move rearwardly. Since the forward tilting of the sub frame 42 also rotates the seed dispensing unit 28 (as indicated by its axis 36) and moves the seed drop point 62 rearwardly (relative to the main frame 12) when the planter 10 is on an uphill slope, this rearward motion of the planting shoe 54 and cover disc helps keep a desired spacing of these elements relative to the seed drop point 62.

At the other end of the spectrum, when the sub frame 42 tilts rearwardly, as shown in FIG. 9, the planting shoe pivot link 57 transmits this motion to the upper end of the planting shoe pivot arm 55, causing it to rotate counterclockwise, and causing the planting shoe 54 to translate forwardly. The disc mount link 67 consequently pulls the disc mount 63 forwardly, causing the cover disc 60 to move forwardly. Since the rearward tilting of the sub frame 42 rotates the seed dispensing row 28 unit so that the seed drop point 62 moves forwardly when the planter 10 is on a downhill slope, the forward motion of the planting shoe 54 and cover disc 60 again helps keep a desired spacing of these elements relative to the seed drop point 62.

Those of skill in the art will recognize that proper seed spacing is very desirable. Seeds that are placed too close together may not have enough room for full and unimpeded growth, resulting in small potatoes. On the other hand, seeds that are spaced too far apart waste space in the field, and result in lower plant density and lower crop yield. The slidable planting shoe 54 and cover disc 60 help control the depth, spacing, and roll back of seeds 58 during the planting process. By controlling these factors the seed has a higher probability of performing as desired. Referring again to FIGS. 7 and 11, having the shoe 54 slide front-to-back, and back-to-front as the seed dispensing assembly 24 changes angle helps to control the seed's dropping point 62. If the seed 58 drops too close to the shoe 54, it can roll back from its initial drop point, which can make the spacing of the seed less accurate. If the seed piece 58 drops too far behind the shoe 54 this can cause the seed to be too shallow, because it is likely to land on top of soil that has fallen back into the furrow 56. When the seed falls at a proper distance from the shoe 54, soil falling back into the furrow 56 captures the seed, keeps it from rolling, and keeps the correct depth. The moveable planting shoe 54 thus helps make the depth and spacing of seeds consistent and accurate. It has been found that the position of the planting shoe 54 relative to the drop point 62 has more influence on potential rollback of the seed than does the position of the cover disc 60 relative to the drop point 62. Consequently, in an alternative embodiment, the hill-compensating planter disclosed herein can be provided with a cover disc assembly that is not movable, but is attached to the main frame 12 at a fixed location, as shown in FIGS. 12-14. Such an embodiment can be an optional feature that is available for users who desire it.

It will be apparent that the present disclosure also teaches a method of making a hill-compensating planter system. In one embodiment, the method of making the device includes pivotally attaching a seed potato dispensing assembly 24, having a dispenser 28 with a dispenser axis 36, to a wheeled frame 12 of a planting device 10, and attaching a control mechanism 49 to the seed potato dispensing assembly 24. The control mechanism 49 can be configured to rotate the dispensing assembly 24 about a generally horizontal axis to maintain the dispenser axis 36 in a substantially upright orientation relative to an uphill or downhill planting direction.

The step of pivotally attaching the seed potato dispensing assembly 24 to the wheeled frame 12 can involve attaching a seed dispensing device 28, such as a cup-type seed potato dispenser, to a discharge of a seed hopper 26, and pivotally attaching the seed hopper 26 to the wheeled frame 12. Pivotally attaching the seed hopper 26 to the wheeled frame 12 can more specifically include fixedly attaching the hopper 26 to a sub frame 42 that is pivotally attached to the wheeled frame 12.

Attaching the control mechanism 49 to the seed potato dispensing unit can further include connecting a tilting actuator 48 to the seed potato dispensing assembly 24, and connecting a self-leveling mechanism to the tilting actuator 48. With this construction, tilting of the seed potato dispensing assembly 24 can be automatically performed upon uphill and downhill operation of the planting device.

The hill-compensating planter 10 disclosed herein thus keeps the seed hopper 26 and seed dispensing units 28 in a substantially upright position whether the planter 10 travels uphill or downhill, thus allowing the planter to consistently drop seeds at a desired spacing and thereby helping to provide a greater yield at harvest. Making sure that the seed dispensing unit stays upright can help satisfy several criteria related to desired functioning of the planter 10. One criteria is consistent seed drop from the hopper to the seed dispensing unit, and a second criteria is the seed drop from the seed dispensing unit to the ground. The first criteria is facilitated by placing the seed hopper 26 adjacent to the seed dispensing unit 28, keeping these two elements in a fixed relationship to each other and upright, regardless of the uphill or downhill travel. With the hopper and the seed dispensing unit upright, the seed drop or capture from the hopper 26 into the seed dispensing unit 28 is kept relatively constant, thus reducing skips when planting uphill, and reducing doubles or triples when planting downhill. The second criteria is promoted by having the planting shoe 54 linked to the tilting sub frame and allowing it to slide front-to-back as the seed dispensing assembly 24 tilts. This helps provide a constant and precise dropping point 62 for the seed relative to the planting shoe and cover disc, regardless of uphill or downhill travel of the planter.

It is to be understood that the above-referenced arrangements are illustrative of the application of the principles of the present invention. It will be apparent to those of ordinary skill in the art that numerous modifications can be made without departing from the principles and concepts of the invention as set forth in the claims.

What is claimed is:

1. A seed planting device operable on ground, comprising:
    a main frame, having wheels, configured to be moved in a planting direction on the ground;
    a seed hopper, attached to the main frame, having a discharge; and
    a seed dispenser, having an upright dispenser axis, disposed adjacent to the discharge of the hopper, having a plurality of cups disposed upon an endless belt, each cup configured to controllably receive and dispense seeds from the hopper, and drop the seeds from a seed discharge below the main frame;
    wherein the seed hopper and seed dispenser are pivotally attached to the main frame and configured to rotate about a generally horizontal axis to maintain the dispenser axis in a substantially upright orientation relative to an uphill or downhill planting direction.

2. A seed planting device in accordance with claim 1, wherein the seed hopper is configured to rotate between angles of plus or minus about fifteen degrees relative to a plane of the main frame.

3. A seed planting device in accordance with claim 1, further comprising a sub frame, supporting the hopper, the sub frame being pivotally connected to the main frame at a pivot point that is substantially aligned with the seed discharge.

4. A seed planting device in accordance with claim 1, further comprising a self-leveling mechanism, coupled to the seed hopper, configured to automatically maintain the substantially upright orientation of the dispenser axis during uphill or downhill planting.

5. A seed planting device in accordance with claim 4, wherein the self-leveling mechanism comprises:
   a tilting mechanism, configured for rotating the hopper and seed dispenser relative to the main frame;
   an inclination sensor, configured to detect an inclination of the hopper and seed dispenser; and
   a controller, coupled to the tilting mechanism, configured to control the tilting mechanism to maintain the hopper and seed dispenser at a desired absolute angle, in response to input from the inclination sensor.

6. A seed planting device in accordance with claim 5, wherein the controller is selectively programmable with the desired absolute angle, and includes an automatic mode, in which the angle of the hopper and seed dispenser are automatically maintained, and a manual mode, enabling a user to directly adjust the angle of the hopper and seed dispenser.

7. A seed planting device in accordance with claim 5, wherein the inclination sensor is configured to detect an inclination of the main frame within a range of about plus or minus 20 degrees, and the tilting mechanism is configured to rotate the hopper and seed dispenser within a range of about plus or minus about 15 and a half degrees relative to the main frame.

8. A seed planting device in accordance with claim 1, further comprising a planting shoe, extending below the main frame forward of the seed discharge, configured to plow a furrow in the ground for receiving a dropped seed, the planting shoe being forwardly and rearwardly moveable with pivoting of the hopper, to substantially maintain a seed drop position a selected distance behind the planting shoe regardless of uphill or downhill angle.

9. A seed planting device in accordance with claim 1, wherein the seed planting device is configured for planting seed potatoes.

10. A planting device, comprising:
    a wheeled frame, configured to move in an uphill or downhill planting direction;
    a seed hopper, attached to the frame;
    a seed dispenser, disposed adjacent to the seed hopper, having an upright dispenser axis and a plurality of cups disposed upon an endless belt, each cup configured to move upwardly upon the belt to receive a seed from the hopper, and move downwardly on the belt to drop the seed below the frame; and
    a self-leveling mechanism, coupled to the seed hopper and seed dispenser, configured to pivot the seed hopper and seed dispenser upon the frame as a unit to automatically maintain the dispenser axis substantially upright when moving in the uphill or downhill planting direction.

11. A planting device in accordance with claim 10, wherein the seed hopper and seed dispenser are configured to rotate between angles of plus or minus about fifteen degrees relative to a plane of the frame.

12. A planting device in accordance with claim 10, further comprising a sub frame, supporting the seed hopper and seed dispenser, the sub frame being pivotally connected to the frame at a pivot point that is substantially aligned with a seed discharge of the seed dispenser.

13. A planting device in accordance with claim 10, wherein the self-leveling mechanism comprises:
    a tilting mechanism, configured for rotating the seed hopper and seed dispenser relative to the frame;
    an inclination sensor, configured to detect an inclination of the seed hopper and seed dispenser; and
    a controller, coupled to the tilting mechanism, configured to control the tilting mechanism to maintain the hopper and seed dispenser at a desired absolute angle, in response to input from the inclination sensor.

14. A planting device in accordance with claim 13, wherein the controller is selectively programmable with the desired absolute angle, and includes an automatic mode, in which the angle of the hopper and seed dispenser are automatically maintained, and a manual mode, in which a user can directly adjust the angle of the hopper and seed dispenser.

15. A planting device in accordance with claim 10, further comprising a planting shoe, extending below the frame forward of a drop point of the seed, configured to plow a furrow in the ground for receiving the seed, the planting shoe being forwardly and rearwardly moveable with pivoting of the hopper, to substantially maintain the seed drop point a selected distance behind the planting shoe regardless of an uphill or downhill angle.

16. A planting device in accordance with claim 10, wherein the seed hopper and seed dispenser are configured for dispensing seed potatoes.

17. A hill-compensating planter, comprising:
    a wheeled frame;
    a sub frame, pivotally attached to the wheeled frame;
    a seed hopper, attached to the sub frame;
    a seed dispenser, attached to the seed hopper, having an upright dispenser axis and a plurality of cups disposed upon an endless belt, each cup configured to move upwardly upon the belt to receive a seed from the seed hopper, and to move downwardly on the belt to drop the seed into a furrow below the wheeled frame; and
    a self-leveling mechanism, coupled to the sub frame, configured to pivot the sub frame to automatically maintain the substantially upright orientation of the dispenser axis during uphill or downhill planting.

18. A hill-compensating planter in accordance with claim 17, further comprising:
    an inclination sensor, configured to detect an absolute inclination of the wheeled frame; and
    a controller, coupled to the inclination sensor and the self-leveling mechanism, configured to control the self-leveling mechanism to maintain the dispenser axis at a desired absolute angle.

19. A hill-compensating planter in accordance with claim 17, further comprising a planting shoe, extending below the wheeled frame forward of a drop point of the seed, configured to plow the furrow for receiving the seed, the planting shoe configured to move forwardly and rearwardly with pivoting of the sub frame, to substantially maintain the seed drop point a selected distance behind the planting shoe regardless of an uphill or downhill angle.

20. A hill-compensating planter in accordance with claim 17, wherein the seed dispenser is configured receive and drop seed potatoes.

* * * * *